United States Patent [19]
Sapir

[11] 3,766,746
[45] Oct. 23, 1973

[54] VOLTAGE TO CURRENT CONVERTER
[75] Inventor: Said Sapir, Westlake Village, Calif.
[73] Assignee: International Telephone and Telegraph Corporation, New York, N.Y.
[22] Filed: Jan. 10, 1972
[21] Appl. No.: 216,688

Related U.S. Application Data
[62] Division of Ser. No. 94,277, Dec. 2, 1970.

[52] U.S. Cl........................ 62/223, 236/78, 236/94, 219/499
[51] Int. Cl........................... F25d 3/10, G05d 23/24
[58] Field of Search.................... 62/223; 236/78 D, 236/78, 94; 219/506, 499; 73/362 AR; 165/362 SC; 324/123, 99 R

[56] References Cited
UNITED STATES PATENTS
3,008,072  11/1961  Jenkins, Jr. et al. .............. 236/15 B
2,528,336  10/1950  Bristol:.............................. 236/78 X Primary Examiner—William E. Wayner
Attorney—C. Cornell Remsen, Jr. et al.

[57] ABSTRACT

A voltage to current converter having an amplifier wherein any change of the output current of the amplifier is directly proportional to any change of its input voltage and independent of its load resistance so long as the amplifier is operating within its capabilities. The converter may be used in a wide variety of applications including, but not limited to, temperature indication. A resistor bridge is employed to produce an output voltage which is a function of temperature. The bridge is used both in temperature indication and temperature controlling. The circuit of the converter needs little power and current. The use of a unique circuit construction makes it possible to produce a meter range of the precise magnitude desired. The use of the same unique circuit construction makes possible high sensitivity and the determination and adjustment of the point at which most accuracy and linearity exists. Meter overvoltage protection is also provided.

5 Claims, 17 Drawing Figures

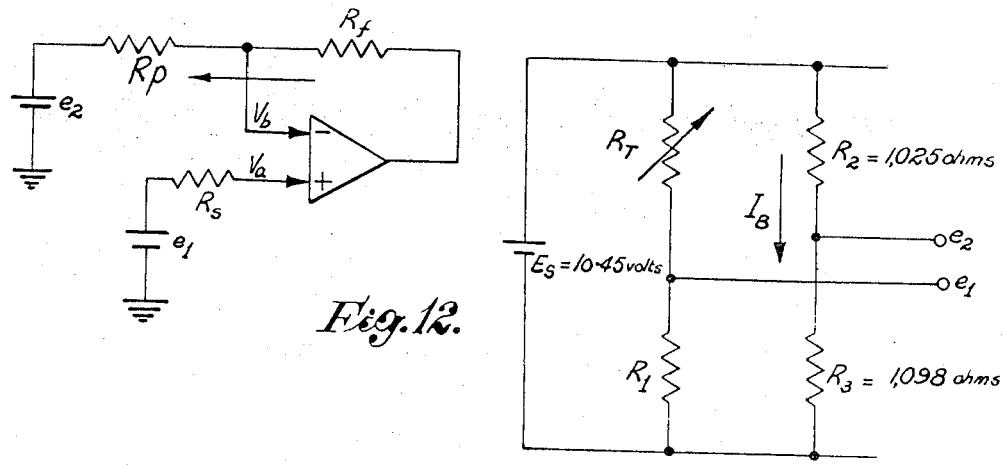
Fig.12.
Fig.13.
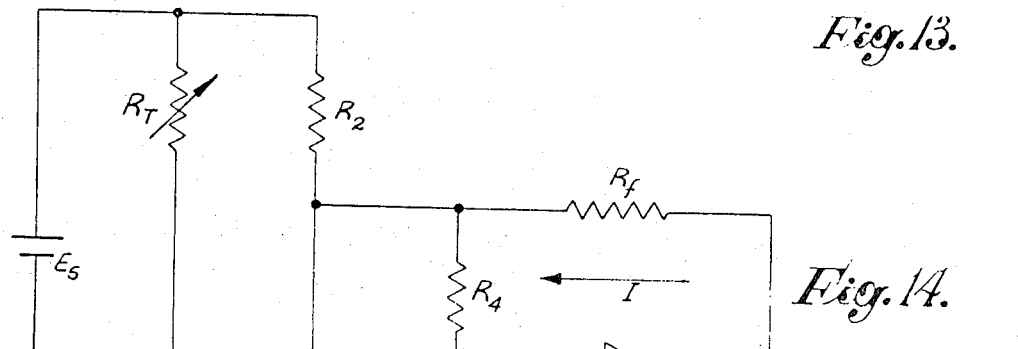
Fig.14.
Fig.16.
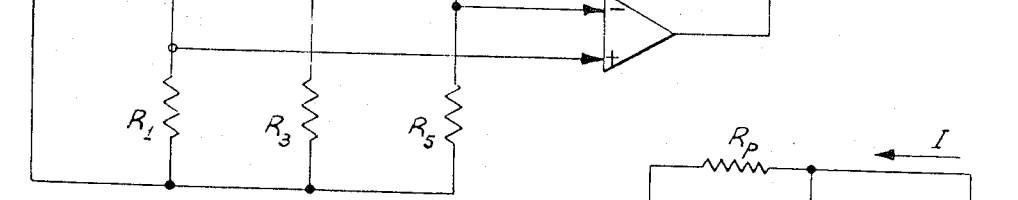
Fig.15.

VOLTAGE TO CURRENT CONVERTER

This is a division of copending application Ser. No. 94,277, filed Dec. 2, 1970. The benefit of the filing date of said copending application is, therefore, hereby claimed for this application.

BACKGROUND OF THE INVENTION

This invention relates to current converters, and more particularly, to a device for producing a flow of current through a circuit, the magnitude of which is directly proportional to an input voltage and independent of the circuit resistance.

This invention will have many applications and should not, therefore, be limited to those disclosed herein. However, the invention has been found especially useful in a temperature indicator which may be located in an environmental chamber such as disclosed in U.S. Pat. No. 3,456,455, the inventor and the assignee of which are identical to those of the present application.

In the past, difficulty has been encountered in temperature indicators utilizing an ammeter or voltmeter calibrated in temperature. In each such case, the indicated current or voltage has often been inaccurate due to the fact that the temperature has been a complex function of the meter impedance. These indicators also have been expensive, have required considerable power and current, and have not been easy to construct, calibrate and adjust.

SUMMARY OF THE INVENTION

In accordance with the device of the present invention, the above-described and other disadvantages of the prior art are overcome by providing a differential amplifier having plus and minus inputs with a first circuit connecting its output to a junction, and a second circuit connected from the junction to a point of reference potential, the second circuit including a third circuit connected from the junction to the minus input. The amplifier used in accordance with the present invention may be any entirely conventional operational amplifier.

The plus input of an operational amplifier may be defined as that input adapted to receive a first voltage, and the minus input may be defined as that adapted to receive a second voltage. If the second voltage is maintained constant, and the first voltage is increased, the output of the amplifier increases. If the second voltage is maintained constant and the first voltage is decreased, the output decreases. Conversely, if the fist voltage is maintained constant, and the second voltage is increased, the output decreases. Further, if the first voltage is maintained constant and the second voltage is decreased, the output increases. Thus, for use herein, the phrases "plus input" and "minus input" are hereby defined as those inputs having the characteristics described herein.

As stated previously, the device of the present invention has broad application and is not limited to temperature indication. The invention produces a current in the said first circuit which is directly proportional to the plus input voltage, and independent of the series resistance of the said first circuit so long as the amplifier is operating within its output capabilities. This unique feature may be employed for any purpose other than temperature indication, but it also may be employed for temperature indication. In the latter case, the first circuit may simply be a series connected ammeter calibrated in temperature. The third circuit may simply be a conductive lead from the junction, a portion of a voltage divider or otherwise. The second circuit may include a resistor, a resistive network or otherwise which may or may not include a D.C. source of potential.

Due to the fact that the feedback connection always drives the minus input to a voltage the same as the input voltage to the plus input, the equivalent resistance of the second circuit causes the amplifier output to produce a flow of current through the first circuit which is directly proportional to the input voltage minus a constant voltage at the plus input divided by the said equivalent resistance. The equivalent resistance is constant. Thus, the current in the first circuit or through the ammeter is directly proportional to the voltage to the plus input minus the said constant voltage. Moreover, the current through the ammeter follows the input voltage to the plus input faithfully independent of the series resistance of the ammeter. This is true because the amplifier always drives the potential of the minus input to a value equal to the voltage applied to the plus input. The amplifier, of course, requires some error signal to drive the minus input voltage to match that of the plus input voltage. However, as all conventional amplifiers do, the amplifier has at least some gain. Even with a moderate gain of 10,000 or 100,000, any error induced by the amplifier in driving the minus input to the plus input voltage is insignificant. Thus, the ammeter faithfully follows the amplifier plus input voltage. If this voltage is made a function of temperature, and the meter properly calibrated, the ammeter can then read directly in temperature.

It is old in the art to produce an output voltage which is a function of temperature. For example, see the said patent.

In accordance with the foregoing, the device of the present invention is advantageous over prior art devices for several reasons. In the first place, no inaccuracies result because of the effect of the ammeter resistance. That is, the device of the present invention generates a current through the ammeter which is independent of its own resistance.

Another feature of the invention resides in the use of a high resistance voltage divider to reduce the power and current requirements of the device of the present invention.

A further feature of the invention resides in the use of a second circuit construction which sets two conditions simultaneously, with a provision for adjustment of either one of the conditions. The first condition is span. That is, if it is desired to operate a temperature indicator between say, −20° F. to +60° F., it is desirable to have the ammeter index needle at one of its extreme limits of travel at −20° F., and its needle at the other of its extreme limits of travel at +60° F. In accordance with the present invention, the said second circuit is so constructed.

Another feature of the invention resides in the fact that the second circuit can be constructed in a manner such that the current through the meter will be zero at any selected temperature.

An outstanding feature of the present invention is that the said second circuit sets both the said span and the said current zero conditions simultaneously.

Another feature of the invention is that a portion of a resistor bridge, disclosed in the said patent, may be used both with the device disclosed therein, and with the device of the present invention. The said bridge thus performs a dual function when so used.

The device of the present invention is highly sensitive.

It is another feature of the present invention that the determination and/or adjustment of the zero current point can effect linearity and accuracy. It is, therefore, an advantage of the invention that this point can be adjusted in that regard. However, as will be explained, the meter indication is extremely linear over the range −20° F. to +60° F. for the circuit values given herein.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIGS. 6–16 are circuit diagrams illustrating the construction and utility of the present invention.

DESCRIPTION OF THE PREFERRED EMBODIMENTS

Figure 1:
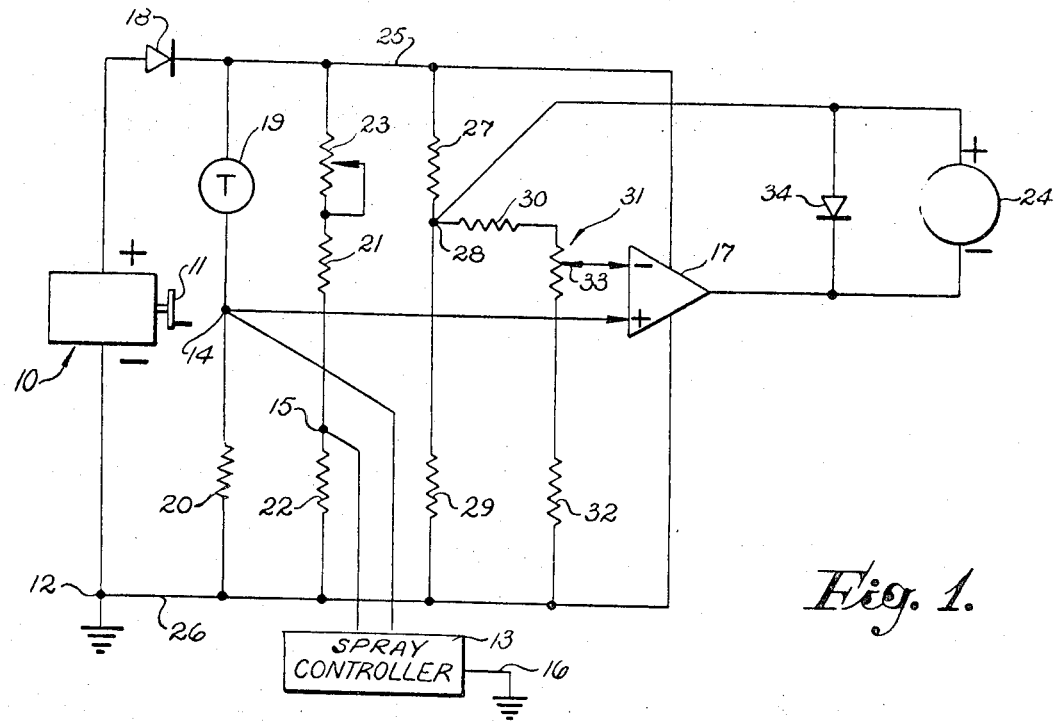
FIG. 1 is a schematic diagram of one embodiment of the present invention.

In FIG. 1, a variable D.C. source of potential is indicted at 10 having a handwheel 11 for adjustment of the magnitude of the output voltage thereof. The negative side of source 10 is grounded at junction 12. However, there need be no ground in the system. A controller 13 is connected from resistor junctions 14 and 15. Controller 13 has a ground connection at 16. If no ground connection is used, lead 16 is simply connected to junction 12, for example.

The circuit of FIG. 1 employs conventional operational amplifier 17. If junction 12 is grounded, that is the only ground in amplifier 17. If junction 12 is not grounded, amplifier 17 has no ground and floats.

A diode 18 is connected in series with the plus output lead of source 10, and is poled in a direction toward amplifier 17. Diode 18 provides reverse voltage protection and prevents the destruction of amplifier 17 if source 10 is connected to diode 18 and junction 12 with the wrong polarity.

Resistors 19, 20, 21, 22 and potentiometer 23 form a conventional bridge circuit.

Controller 13 may be identical to all the structure shown in either one of the embodiments of the invention disclosed in the said patent.

Note that amplifier 17 receives a plus input from junction 14. Resistor 19 is temperature sensitive. The embodiment of the invention shown in FIG. 1 may thus be employed for both controlling the temperature of an environmental chamber, and for temperature indication. Potentiometer 23, and resistors 21 and 22 are employed only for use in controller 13. They thus do not form a part of the separate feature of the invention which includes temperature indication. That is, the temperature indication feature may be employed in combination with controller 13 or without it.

Figure 3:
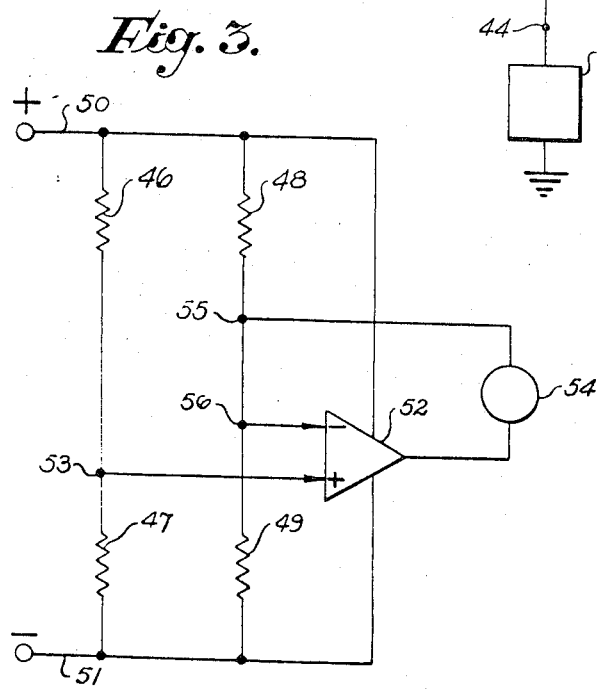

Note will be taken that controller 13 does not incorporate the bridge 130 shown in FIG. 3 of the said patent because it is wholly incorporated in FIG. 1 by way of resistors 19, 20, 21 and 22, and potentiometer 23.

Resistor 19 is a temperature sensitive resistor or probe resistor which is located in the place where temperature is of sufficient importance that it should be indicated or otherwise.

Source 10 has been shown to be adjustable, and by so adjusting it, it is possible to make an ammeter 24 calibrated in degrees Farenheit read in temperature over different ranges. However, where the range is more or less fixed, source 10 need not be adjustable. Further, source 10 need not be supplied with the unit. For example, the source 10 may be the battery of a truck such as indicated in FIG. 1 of said patent.

A lead 25 is connected from the cathode of diode 18 to amplifier 17. A lead 26 is connected from junction 12 to amplifier 17. A resistor 27 is connected from lead 25 to a junction 28. A resistor 29 is connected from junction 28 to lead 26. A resistor 30, a potentiometer 31 and a resistor 32 are connected in series, in the order cited, from junction 28 to lead 26. Potentiometer 31 has a wiper 33 which is connected to the minus input of amplifier 17.

Ammeter 24 is connected in series from the output of amplifier 17 to junction 28. A diode 34 is connected in parallel with ammeter 24. Diode 34 is poled to be conductive toward the output of amplifier 17.

The output of amplifier 17 is bi-directional between the potentials of leads 25 and 26. That is, it floats and can drive current in either direction through meter 24. However, if desired, meter 24 can be constructed to pass current in only one direction, and the circuit so designed.

Diode 34 protects meter 24 in the event that probe resistor 19 breaks and there is an open between lead 25 and junction 14. The series resistance of meter 24 is so small that the parallel resistance of diode 34 does not affect the accuracy of the indication even though amplifier 17 is causing current to flow in a direction from junction 28 to its output. Note will also be taken that the forward resistance of a diode at very low voltages is quite high.

The components of the circuit of FIG. 1 may have values as follows. All of the values given are approximate.

| | |
|---|---|
| Source 10 | 12 volts |
| Diode 18 | 1N774 |
| Resistor 19 | 2,000 ohms at 32° F. |
| Resistor 20 | 2,000 ohms, 0.5 percent, ⅛ watt |
| Potentiometer 23 | 1,000 ohms |
| Resistor 21 | 1,620 ohms, 0.5 percent, ⅛ watt |
| Resistor 22 | 2,000 ohms, 0.5 percent, ⅛ watt |
| Resistor 27 | 1,020 ohms, 0.5 percent, ⅛ watt |
| Resistor 30 | 3,740 ohms, 0.5 percent, ⅛ watt |
| Potentiometer 31 | 100 ohms |
| Resistor 32 | 6,190 ohms, 0.5 percent, ⅛ watt |
| Resistor 29 | 9,530 ohms, 0.5 percent, ⅛ watt |
| Diode 34 | TS–05 |

OPERATION OF THE EMBODIMENT OF FIG. 1

In FIG. 1, when the temperature of resistor 19 increases, the potential of junction 14 will fall. Amplifier 17 will then drive wiper 33 of potentiometer 31 at the minus input of amplifier 17 to the same potential as that of junction 14. The change of the current through meter 24 is then directly proportional to the change of the potential at junction 14, as will be explained. Although the potential at junction 14 is not a linear function of temperature, it is almost linear, and for whatever non-linearity exists, meter 24 may be appropriately calibrated.

Potentiometer 31 can usefully be employed to adjust at what potential at junction 14 the current through meter 24 is zero.

Figure 4:
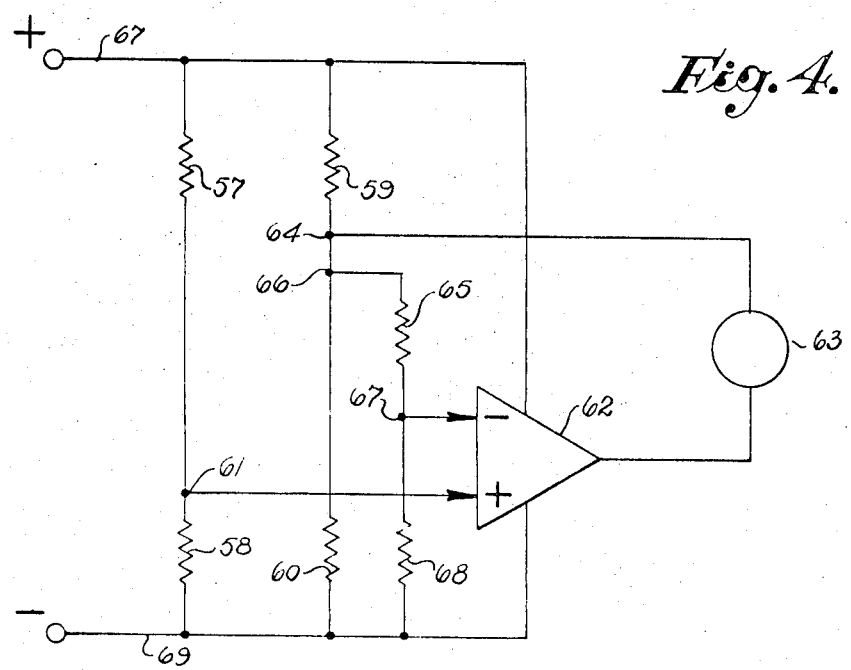

The range of temperature over which meter 24 can operate full scale can be adjusted by rotating handwheel 11 of source 10. As will be explained, the adjustments provided by potentiometer 31 and source 10 are fine adjustments. Major adjustments are made in circuit construction. That is, for example, the potentiometer 31 may be omitted and the circuit reconnected as shown in FIG. 4, if desired. Also, as stated previously, source 10 need not be adjustable. The use of the adjustability of potentiometer 31 and the adjustability of the source 10 are thus only refinements.

THE EMBODIMENT OF FIG. 2

Figure 2:
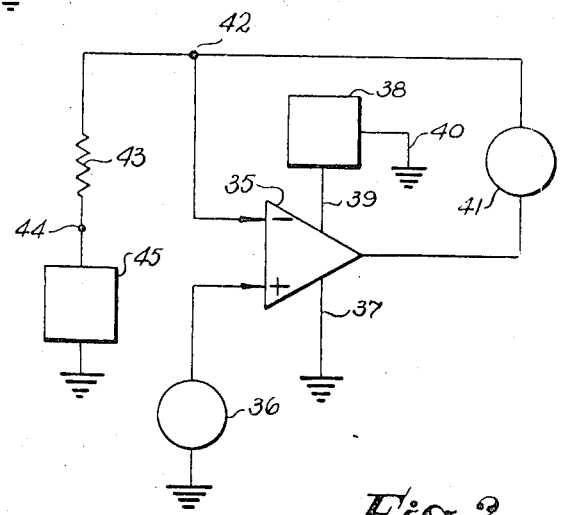
FIGS. 2, 3 and 4 are schematic diagram of alternative embodiments of the present invention.

Another embodiment of the present invention is shown in FIG. 2. This embodiment illustrates that there are a great many refinements in the circuit of FIG. 1 which may not be used by themselves or in combination without departing from the invention. That is, there are refinements other than potentiometer 31 and source 10.

In FIG. 2, an amplifier 35 is supplied with a plus input voltage by a source 36. The output voltage of source 36 may be variable or constant, whichever is desired.

Amplifier 36 may be grounded as indicated at 37. Alternatively, only a common line may be employed and no ground needed or employed. Ground 37 is the only ground supplied to amplifier 35.

A D.C. source of potential 38 is connected to amplifier 35 at 39, and to ground at 40.

An ammeter 41 is connected from the output of amplifier 35 to a junction 42. A resistor 43 is connected from junction 42 to a junction 44. Means 45 are connected from junction 44 to ground. Means 45 may be a D.C. source of potential, or simply a conductive lead, whichever is desired.

Junction 42 is also connected to the minus input of amplifier 35.

The operation of the embodiment shown in FIG. 2 is the same as that described in connection with FIG. 1. Meter 41 will indicate a current directly proportional to the output voltage of source 36, the minus input of amplifier 35 always being driven to a voltage which is equal to the output voltage of source 36.

In the case of FIG. 2, it will be noted that the resistance of resistor 43 must be low in comparison to the input resistance of the minus input of amplifier 35. This is true because the input current to the minus input of amplifier 35 should be small in comparison to the current through meter 41 and through resistor 43. However, this requirement is not severe since the input resistances of operational amplifiers are conventionally very high.

Note will be taken that if means 45, i.e. means to connect junction 44 to ground, is a conductive lead, and amplifier 35 drives the minus input thereof to the output voltage of source 36, junction 42 will also have a potential equal to the output potential of source 36 and the current through resistor 43 will be simply the output voltage of source 36 divided by the resistance of resistor 43.

If means 45 is a D.C. source of potential, for example, poled in a direction to bias junction 44 positive with respect to ground, the current through resistor 43 will be the difference between the output voltages of source 36 and source 45 divided by the resistance of resistor 43. However, the rate of change of current through resistor 43 will still be directly proportional to the rate of change of the output voltage of source 36, and meter 41 need be calibrated only for a fixed offset. That is, if the voltage supplied by means 45 is constant, any current through resistor 43 that is due solely to the output voltage of means 45 will also be constant.

THE EMBODIMENT OF FIG. 3

In FIG. 3, resistors are indicated at 46, 47, 48 and 49. These resistors are connected in the shape of a bridge circuit between D.C. voltage source input leads 50 and 51. However, these resistors do not form a true bridge because an amplifier 52 is employed, the minus input of which is driven to the potential of the plus input thereof, supplied from a junction 53 between resistors 46 and 47, as before.

An ammeter 54 is connected from the output of amplifier 52 to a junction 55 between resistors 48 and 49.

Another junction 56 between resistors 48 and 49 is connected to the minus input of amplifier 52.

As before, leads 50 and 51 are connected to amplifier 52.

In the embodiment of FIG. 3, resistor 46 is again the temperature sensitive resistor.

The operation of the embodiment of FIG. 3 is the same as before. Junction 56 is driven to the potential of junction 53 and meter 54 may be an ammeter calibrated in temperature.

All of the embodiments of the invention disclosed herein may be constructed in the same manner. However, only the construction of the embodiment of FIG. 4 will be described in greater detail.

THE EMBODIMENT OF FIG. 4

The embodiment of FIG. 4 includes several structures shown in FIG. 1, the use of which has a number of advantages.

In FIG. 4, resistors are provided at 57, 58, 59 and 60 which, in some respects, correspond to resistors 46, 47, 48 and 49, respectively, shown in FIG. 3. Resistors 57 and 58 have a common junction 61 connected to the plus input of amplifier 62, as before. Resistor 57 is a temperature sensitive resistor.

As in FIG. 3, an ammeter 63 is connected from the output of amplifier 62 to a junction 64 between resistors 59 and 60. However, a resistor 65 is connected from a junction 66 between resistors 59 and 60 to a junction 67 which is connected to the minus input of amplifier 62.

A resistor 68 is connected from junction 67 to an input lead 69.

As before, another input lead 67 is provided, both input leads 67 and 69 being connected to amplifier 62.

Comparison of FIG. 4 to FIG. 1 will reveal that source 10 and diode 18 have been omitted as refinements. The same is true of controller 13, its ground connection 16 and its connections to junctions 14 and 15, respectively. Also omitted have been potentiometer 23, resistor 21 and resistor 22. The omission of structure from FIG. 4 results in the omission of refinements. This is not to say that the refinements are not substantially advantageous and features of the invention whether practiced or not.

Again, comparing FIg. 4 with FIG. 1, resistors 59 and 60 of FIG. 4 correspond to resistors 27 and 29 of FIG. 1, respectively.

Diode 34 has been omitted as a refinement.

Again comparing FIGS. 1 and 4, note will be taken that resistor 65 can replace the resistance of resistor 31 and that portion of potentiometer 31 above the position of wiper 33.

Similarly, resistor 68 replaces the resistance of resistor 32, and that portion of potentiometer below the position of wiper 33.

In FIG. 4, resistor 57 is again the temperature sensitive resistor.

Figure 5:
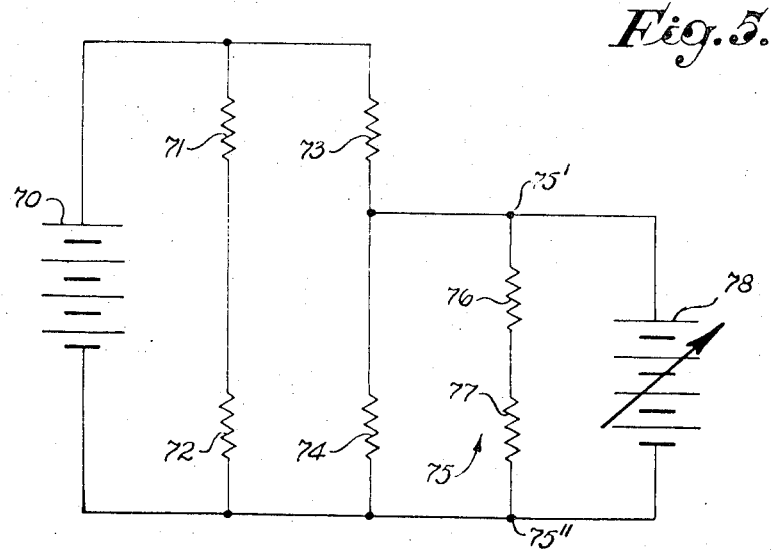
FIG. 5 is a schematic diagram of an equivalent circuit of that shown in FIG. 4.

An equivalent circuit of FIG. 4 may be drawn as indicated in FIG. 5 including a battery 70 connected across resistors 71, 72, 73 and 74. A series circuit 75 including resistors 76 and 77 are connected in parallel with resistor 74. A variable D.C. source of potential 78 is connected across the said series circuit 75.

Resistor 71 may be the temperature sensitive resistor. Thus, resistors 71, 72, 73, 74, 76 and 77 may respectively be identical to resistors 57, 58, 59, 60, 65 and 68.

Source of potential 70 may be any source which is or is to be connected between leads 67 and 69. Source 78 may be the output voltage of amplifier 62.

Comparison of FIGS. 4 and 5 will reveal that all that has been omitted has been the connections from junctions 61 and 67 to the plus and minus inputs of of amplifier 62. The current to the plus input is insignificant due to the high impedance of the plus input of the amplifier. The same is true of the input lead to the minus input of amplifier 62.

Meter 63 is drawn in FIG. 5 as though being shorted. The equations derived from FIG. 5 are independent of the resistance of the meter. The following is an explanation of this phenomenon.

The equivalent circuit of the voltage-to-current converter of the present invention would be identical to FIG. 14 with the amplifier removed, the input leads thereto omitted, and the right end of meter resistance, $R_f$, connected to the positive terminal of a battery, $V_o$, the negative terminal of battery $V_o$ being connected to the negative terminal of battery $E_s$.

FIG. 16 shows the circuit of FIG. 14 where $R_4$ has been omitted and $E_s$, $R_f$, $R_1$, $R_2$ and $R_3$ have been replaced by their Thevenin's equivalent, and $R_4$ and $R_5$ have been replaced by $R_a$. However, assume that $R_f$ is still connected in series between the positive terminal of battery $V_o$ and the junction in FIG. 16 which is at potential $V_c$. Also assume a current in $R_f$ toward the junction of I, a current away from the junction in $R_p$ of I, and a current away from the junction in $R_a$ of $I_2$.

In FIG. 16, $V_c = V_o - IR_f$
$I = I_1 + I_2$
$I_1 = (V_c - E_2)/R_p$
$I_2 = V_c/R_a$
$I = (V_c - E_2)/R_p + V_c/R_a = V_c (1/R_p + 1/R_a) - E_2/R_p$ $V_c$ is shown in the following to be a fixed function of the input voltage (voltage at plus input). This means that the amplifier adjusts its output voltage to be able to keep $V_c$ at $Ke_{in}$ volts regardless of $R_f$.

Now, we replace $V_c$ by its value $Ke_{in}$. We will have, $I = Ke_{in} (1/R_p + 1/R_a) - E_2/R_p$, or $I = Ke_{in} (R_a + R_p)/R_p R_a - E_2/R_p$ This equation shows that I is independent of $R_f$.

From the foregoing, it will be readily appreciated that the circuit of FIG. 5 can be readily solved by Thevenin's Theorem.

In practice the use of resistors 65 and 68 is useful because resistor 60 is made large to reduce the power and current requirements of the circuit. When this is done, without resistors 65 and 68 as in FIG. 3, the amplifier must work very hard to drive the potential of the minus input down to that of the plus input. Thus, resistors 65 and 68 act as a voltage divider.

The advantage of FIG. 3 is twofold. The use of a portion of the probe bridge with the temperature indicator makes it possible to use the selfsame portion for both temperature indication and temperature control by controller 13. Further, the resistors 48 and 49 make is possible to locate the undriven potential of the minus input to the amplifier near where the plus input potential usually is. The amplifier thus does not have to work as hard.

In FIG. 4, resistances of probe resistors 57 and resistor 58 may or may not, as desired, be selected for their utility in connection with their use in the controller 13. The same is true of probe resistor 19, resistors 20, 21 and 22 and potentiometer 23 shown in FIG. 1.

Some outstanding advantages of the invention may be achieved through the selection of all of resistors, but resistors 59, 60, 65 and 68 especially.

Figure 6:
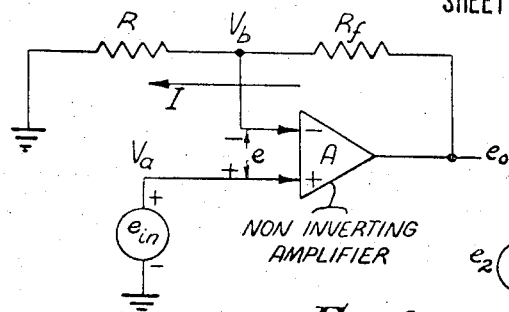

FIG. 6 shows a differential operational amplifier arranged in a non-inverting amplifier configuration. If the open loop gain of the amplifier is A then we can say: $e_o = Ae$. From FIG. 6, we can write: $V_b = e_o R/(R_f + R)$. Also that $e = V_a - V_b$. Substituting $e_o R/(R_f + R)$ for $V_b$, $e = V_a - e_o R/(R_f + R)$. Also substituting $Ae$ for $e_o$, we will have $e = V_a - Ae R/(R_f + R)$, and $e = V_a/[1 + AR/(R_f + R)]$.  I It can be seen that e approaches zero if A becomes very large. This tells us that in an amplifier circuit employing a very high gain differential operational amplifier the use of negative feedback causes the two inputs of the amplifier to stay at the same potential. So it could be said that $V_a = V_b$ and since $V_a$ is the same as the $e_{in}$ we can say $V_b = e_{in}$. From here, we can simply derive the value of I as $I = V_b/R$ or $I = e_{in}/R$. If $R_f$ were the resistance of our load, (e.g. internal resistance of a meter), it can be seen that such a load will see the current I which was developed in proportion to the input voltage $e_{in}$.

It should be noted here that one assumption was made in deriving the equation $V_b = e_o R/(R_f + R)$. We assumed that no current was drawn by the negative input of the amplifier.

This assumption is not very unrealistic since all modern differential operational amplifiers require bias currents in order of tenths of microamperes. Such small currents can be neglected in comparison to the normally encountered values for I. The open loop voltage gains of modern differential operational amplifiers are very high making e of equation (I) very close to zero.

Figure 7:
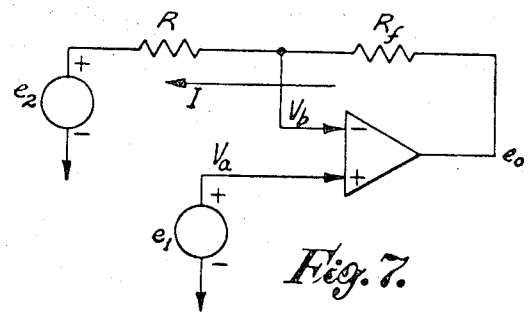

Using a similar method as in FIG. 6, in FIG. 7 we can show that $V_a$ and $V_b$ will track each other and remain at the same potential. Assuming, then, that $V_b = V_a = e_1$ and that input bias current of the amplifier is negligable, we can derive an expression for I; $I = (V_b - e_2)/R$, and since $V_b = e_1$, $$I = (e_1 - e_2)/R \qquad \text{II}$$

Equation (II) shows that we can generate a current through a floating load, $(R_f)$, which is proportional to the difference of two independent voltage sources.

Examining FIG. 7, it can be seen that I flows through $e_2$ where the voltage source $e_1$ is only loaded by the very insignificant input bias current of the operational amplifier.

Figure 8:
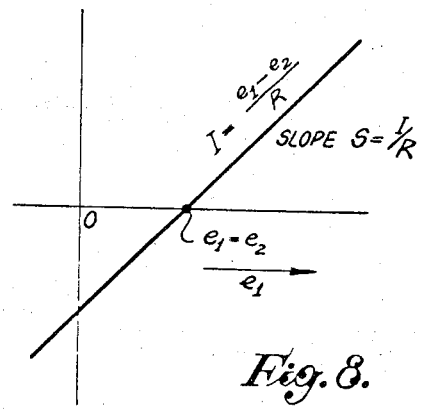

Examining equation (II), $(I = (e_1 - e_2)/R)$, it can be seen that if $e_1$ were a variable voltage and $e_2$ were a fixed voltage, by choosing an appropriate value for $e_2$, we can cause the current to become zero at a preselected value of $e_1$, namely when $e_1$ becomes equal to $e_2$. FIG. 8 shows $I$ vs. $e_1$ for a fixed $e_2$.

Figure 9:
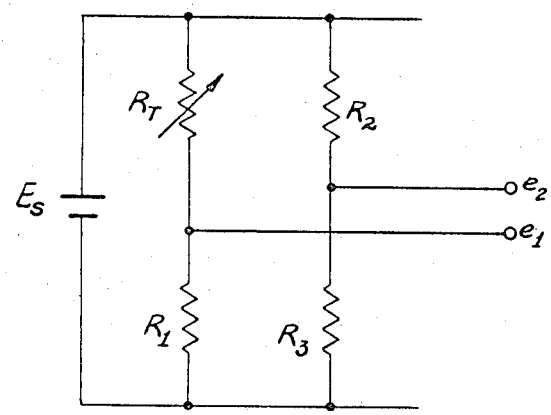

FIG. 9 shows a bridge with three fixed legs and one variable leg.

From FIG. 9, we can calculate $e_1$ and $e_2$ as follows.

$$e_1 = E_s R_1/(R_1 + R_T); e_2 = E_s R_3/(R_2 + R_3).$$

Figure 10A:
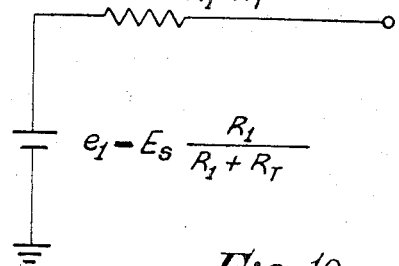
Figure 10B:
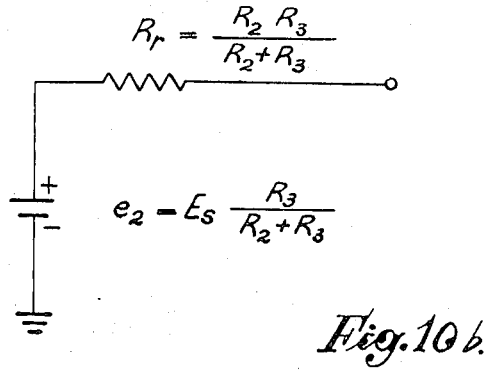

Thevenin's equivalent of the bridge could be drawn as in FIGS. 10a and 10b.

Figure 11:
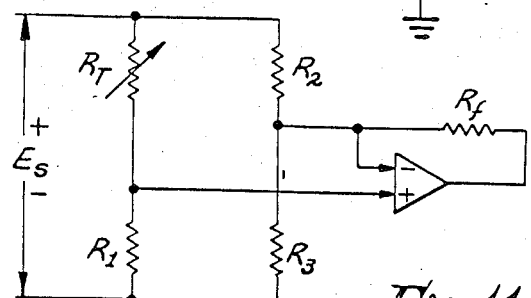

Now let us examine FIG. 11 which is a bridge hooked up with an operational amplifier in a non-inverting amplifier configuration.

Replacing the bridge in FIG. 11 with its equivalent circuit shown in FIG. 10, we will have FIG. 12.

Since the only current that flows through $R_s$ (in FIG. 12) is the input bias current of the operational amplifier and since this current is very minute, the difference between $e_1$ and $V_a$ can be neglected. This means that $V_a = e_1$. From the circuit we could derive $I$ to be $I = (V_b - e_2)/R_p$. Since $V_b = V_a = e_1$, we can write, $$I = (e_1 - e_2)/R_p \qquad \text{III}$$

$e_2$ is a fixed voltage since $E_s$, $R_2$ and $R_3$ are fixed. $e_1$ is a variable voltage since $R_T$ varies.

Differentiating equation (III) with respect to the variable $e_1$, we can derive the resultant variation in I.

$$\Delta I = (1/R_p)\Delta e_1 \qquad \text{IV}$$

It can be seen from equation (IV) that $R_p$ and only $R_p$ determines how much change of current is produced for a given change in $e_1$. Therefore, $1/R_p$ determines the sensitivity of the voltage to current converter circuit.

Rephrasing the foregoing statement, we can say $R_p$ determines the span of input voltage variation which is required to produce a given current change. For example, we want to develop a 1 ma. change of current (the current range of the ammeter) for an input voltage span of 0.53 volt, we will have to set $R_p = 0.53$ v./1 ma. = 530 Ω.

From equation (III), it could be seen that $e_2$ determines at what value of $e_1$ the current is zero. Suppose our design requirements dictated that current should be zero when the input voltage $(e_1)$ is 5.4 volts. This means that $e_2$ should be set equal to 5.4 volts.

To summarize: $R_p$ determines the span and $e_2$ determines the zero. We derive the values of $R_p$ and $e_2$, $$R_p = R_2 R_3/(R_2 + R_3); \qquad e_2 = E_s [R_3/(R_2 + R_3)].$$

As can be seen, for a given $E_s$, our required values of zero and span define the values of $R_2$ and $R_3$. For example, if required, $R_p = 530Ω$ and $e_2 = 5.4$ volts. Assuming the battery voltage $E_s = 10.45$ volts, we can derive the values of $R_2$ and $R_3$.

Dividing $R_p$ by $e_2$, we have, $$\frac{R_p}{e_2} = \frac{\frac{R_2 R_3}{R_2 + R_3}}{E_s \frac{R_3}{R_2+R_3}} \text{ or } \frac{R_p}{e_2} = \frac{R_2}{E_s} \text{ or } R_2 = \frac{E_s R_p}{e_2} \qquad \text{(V)}$$

Inserting the value of $R_2$ as derived above in $R_p = R_2 R_3/(R_2 + R_3)$, we can find $R_3$.

$$R_3 = E_s R_p/(E_s - e_2) \qquad \text{VI}$$

Plugging values of $E_s$, $R_p$ and $e_2$ into equation (V) and equation (VI), we can find $R_2$ and $R_3$.

$R_2 = (10.45 \times 530)/5.4 = 1,025Ω$ or 1.025KΩ

$R_3 = (10.45 \times 530)/(10.45 - 5.4) = (10.45 \times 530)/5.05 = 1,098Ω$ or 1.098KΩ

Examining the bridge of FIG. 13 with the values of $R_2$, $R_3$ and $E_s$, we can see that the standby current through $R_2$ and $R_3$ is, $I_B = E_s/(R_2 + R_3) = 10.45/(1.098K + 1.025K) = 10.45/2.123K = 4.86$ ma.

Total power dissipation is 4.85 ma. × 10.45 volts = 50.6 mw.

In an application where the voltage source is a battery, it might be desirable to reduce the standby current, $I_B$, to conserve energy. This can be done if higher resistance values could be assigned to $R_2$ and $R_3$. The values of $R_2$ and $R_3$ are, however, determined by the values of the power supply voltage, $E_s$, the span and the zero. It may be required that these latter parameters not be changed. The circuit designer may thus be required to live with the excessive current drain through the bridge.

FIG. 14 depicts a circuit similar to that of FIG. 6 except that the voltage feedback to the negative input of the operational amplifier has been further attenuated through use of $R_4$ and $R_5$. This circuit makes it possible to reduce the standby current flowing through $R_2$ to an acceptable level.

Replacing the bridge in FIG. 14 by its Thevenin's equivalent, we will have FIG. 15.

From FIG. 15, $$E_2 = E_s [R_3/(R_2 + R_3)], R_p = R_2 R_3/(R_2 + R_3)$$

$$e_{in} = E_s [R_1/(R_1 + R_T)], R_s = R_1 R_T/(R_1 + R_T)$$

As can be seen from FIG. 15, the current through $R_f$ is made up of two elements, $I_1$ and $I_2$. Where $I_1 + I_2 = I$, neglecting the minute drop across $R_s$, we can write, $$V_b = V_a = e_{in}$$

Assuming that the input bias current into the negative input of the amplifier to be much smaller than $I_2$, we can write, $$V_c = V_b [(R_4 + R_5)/R_5]$$

Since $V_b = e_{in}$, we can write, $$V_c = e_{in} [(R_4 + R_5)/R_5]$$

If, $$(R_4 + R_5)/R_5 = K \qquad \text{VII}$$

then, $$V_c = Ke_{in} \qquad \text{VIII}$$

FIG. 16 shows the flow path for $I_1$ and $I_2$ and the driving sources $E_2$ and $V_1$. The input bias current to the negative input of the operational amplifier has been neglected in FIG. 16. Deriving the value of the $I$ by the use of the Superposition Theorem, we will have, $$I + \frac{\frac{V_c}{R_p R_a} - \frac{E_2}{R_p}}{R_p + R_a}$$

where $R_a = R_4 + R_5$, or $$I = V_c [(R_p + R_a)/R_p R_a] - E_2/R_p$$

Replacing $V_c$ by its value from equation (VIII), we will have, $$I = Ke_{in}](R_p + R_a)/R_p R_a] - E_2/R_p \qquad \text{IX}$$

Differentiating equation (IX) with respect to $e_{in}$, we will have, $$\Delta I = \Delta e_{in} K [(R_p + R_a)/R_p R_a] \qquad \text{X}$$

From equation (X), we can write, $$\Delta I/\Delta e_{in} = K [(R_p + R_a)/R_p R_a] \qquad \text{XI}$$

From equation (IX), we can see that $I$ becomes zero when, $$Ke_{in(o)} [(R_p + R_a)/R_p R_a] = E_2/R_p \qquad \text{XII}$$

where $e_{in(o)}$ is that value of $e_{in}$ which causes $I$ to become zero. From equation (XII), $$E_2 = Ke_{in(o)} [(R_p + R_a)/R_a] \qquad \text{XIII}$$

Dividing (XI) by (XIII), we will have, $$\Delta I/(E_2 \Delta e_{in(o)}) = 1/(R_p e_{in(o)})$$

or $$\Delta I/\Delta e_{in} = E_2/(R_p e_{in(o)}) \qquad \text{XIV}$$

Replacing $E_2$ by its value $E_s [R_3/(R_2 + R_3)]$ and replacing $R_p$ by its value $(R_2 R_3)/(R_2 + R_3)$, we will have $\Delta I/\Delta e_{in} = E_s/(R_2 e_{in(o)})$, and from here, $$R_2 = (E_s \Delta e_{in})/(e_{in(o)} \Delta I) \qquad \text{XV}$$

$\Delta e_{in}/\Delta I$ is a known quantity given by the input voltage span and required output current span. $e_{in(o)}$ is also a known value of the input at which the output current is required to become zero. $E_s$ is the battery voltage. The value of $R_2$ is, therefore, defined by the input and output requirements of the circuit.

Let us now take equation (XIII) and replace $E_2$ by its value $E_s [R_3/(R_2 + R_3)]$.

$$E_s [R_3/(R_2 + R_3)] = Ke_{in(o)} [(R_p + R_a)/R_a] \qquad \text{XVI}$$

Since, $$R_p = R_2 R_3/(R_2 + R_3)$$

then, $$R_3/(R_2 + R_3) = R_p/R_2$$

Inserting this in equation (XVI), we will have, $$E_s (R_p/R_2) = Ke_{in(o)} [(R_p + R_a)/R_a], \quad (R_p + R_a)/R_a = 1 + R_p/R_a$$

$$E_s (R_p/R_2) = Ke_{in(o)} [1 + R_p/R_a]$$

Factor $R_p$, $$R_p [E_s/R_2 - (Ke_{in(o)}/R_a)] = Ke_{in(o)}$$

$$R_p = \frac{Ke_{in(o)}}{\frac{E_s}{R_2} - \frac{Ke_{in(o)}}{R_a}}$$

We also know that $R_p = [R_2 R_3/(R_2 + R_3)]$ $$\frac{R_2 R_3}{R_2 + R_3} = \frac{Ke_{in(o)}}{\frac{E_s}{R_2} - \frac{Ke_{in(o)}}{R_a}} \qquad (XVII)$$

In equation (XVII), $$[(R_2 + R_3)/R_2 R_3] = E_s/(R_2 Ke_{in(o)}) - 1/R_a$$

Factor $R_3$, $$R_3 [E_s/(Ke_{in(o)}) - R_2/R_a - 1] = R_2$$

$$R_3 = \frac{R_2}{\frac{E_s}{Ke_{in(o)}} - \frac{R_2}{R_a} - 1} \qquad (XVIII)$$

From (VII), $K = (R_4 + R_5)/R_5$ and $R_a = R_4 + R_5$, so $K = R_a/R_5$ or $R_a = KR_5$. Replacing $R_a$ by $KR_5$ in equation (XVIII), $$R_3 = \frac{R_2}{\frac{E_s}{Ke_{in(o)}} - \frac{R_2}{KR_5} - 1} \qquad (XIX)$$

In equation (XIX), there are two unknown quantities $K$ and $R_5$. $R_5$ and $K$ can be selected arbitrarily to yield a high value for $R_3$. However, certain circuit restraints limit the ranges of values for $K$ and $R_5$.

Referring back to FIG. 15, we assumed that the input bias current into the negative input of the operational amplifier was much smaller than $I_2$. Proper selection of the resistance of $R_5$ insures that the above assumption holds true. Since the voltage across $R_5$ is always equal to the input voltage $e_{in}$, the current through $R_5$ is $I_{R5} = e_{in}/R_5$. This current must be kept greater than the amplifier's bias current $I_b$. A good rule of thumb is $I_{R5\,(min.)} \geq 100\, I_{b(max.)}$. Since $I_{R5(min.)} = e_{in(min.)}/R_5$, then $e_{in(min.)}/R_5 \geq 100\, I_{b(max.)}$, or, $R_5 \leq e_{in(min.)}/(100\, I_{b(max.)})$     XX For example, if $e_{in(min.)} = 5.04$ volts and $I_{b(max.)} = 4\,\mu a$, then $$R_5 \leq 5.04/(4\,\mu a \times 100) = (5.04 \times 10^4)/4 = 12.6\, K\Omega$$

$$R_5 \leq 12.6\, K\Omega$$

Since $V_c = Ke_{in}$, $K$ should be chosen so that $V_c$ remains within the output voltage range of the operational amplifier.

$$Ke_{in(max.)} \leq e_{o(max.)} - I_{(max.)}R_f$$
$$K \leq (e_{o(max.)} - I_{(max.)}R_f)/e_{in(max.)}$$
                                   XXI where $e_{o(max.)}$ is the maximum output voltage swing of the amplifier.

The following words and phrases are defined for use throughout this entire specification and in the claims.

A source of potential is hereby defined as any circuit with or without resistors or other circuit components. A source of potential is also defined alternatively to include a bridge, a conductive lead or otherwise. A source of potential is also defined alternatively to include any of the foregoing with or without a battery or the like as well as a battery itself or the like.

The phrase "means to provide a source of potential" is hereby defined to include electrical lead wires without any battery or power supply or the like connected thereto. The phrase "means to provide a source of potential" is alternatively defined to include circuit components or one or more circuits with or without one or more batteries or power supplies or the like. The phrase "means to provide a source of potential" is hereby defined to alternatively include one or more batteries or power supplies or the like.

A circuit is hereby defined to mean means to connect.

Means to connect is hereby defined as including any component, meter, ammeter, indicator or lead. That is, means to connect is defined alternatively to include a lead with or without a component.

Means to provide resistance is defined to include a single resistance including, but not limited to, a single resistor. Means to provide resistance is also defined alternatively to include a plurality of resistances of any number including, but not limited to, a plurality of resistors of any number.

The word "resistance" is hereby defined to mean, of course, electrical resistance.

The word "ammeter" is hereby defined to include an ammeter or equivalent calibrated in any way or not calibrated at all. The word "ammeter" is alternatively defined to include any instrument which indicates or records electric current passing therethrough, whether or not such recording is performed visually or nonvisually.

The symbol $I_t$, i.e. the range of the ammeter is obtained simply by subtracting the lowest current which the ammeter will indicate from the highest current the ammeter will indicate. For example, if the lowest current is $-3$ mils, and the highest current is $+7$ mils, the range of the instrument is 10 mils. If the lowest current is zero, and the highest current is 10 mils, the range of the instrument is again 10 mils. If the lowest current is $-5$ mils, and the highest current is $+5$ mils, the range of the instrument is again 10 mils.

If, as stated previously, $V_c$ is the voltage at the minus input, $V_{cm}$ may be the maximum voltage at the minus input. Thus, in FIG. 4, junction 64 should not rise to a potential above $kV_{cm}$.

From the foregoing, it will be appreciated that substantially improved accuracy in indication is achieved by connecting the ammeter from the amplifier output to its minus input. Thus, as in FIG. 2, the current through resistor 43 will be substantially the same as that through ammeter 41, and the potential of junction 42 will be equal to the input potential of the plus input of amplifier 35. Due to the fact that junction 42 always stays at $V_a$ regardless of the resistance of ammeter 41, substantially improved accuracy results in measuring and indication.

Another feature of the invention resides in the use of a high resistance resistor 60 with the voltage divider provided by resistors 65 and 68 to unload amplifier 62 and, at the same time, minimize power and current consumption. That is, the high resistance of resistor 60 in itself reduces the power and current requirements of the circuit of FIG. 4.

The sensitivity of the bridge is a maximum when resistors 57 and 58 in FIG. 4 have equal resistances. That is, under this condition, junction 61 will rise in potential at a greater rate per degree of temperature than under any other condition.

The point at which the current through meter 63 in FIG. 4 is zero is the point at which the most accuracy and linearity exists. It is thus an outstanding feature of the invention that this point can be controlled by properly selecting resistance values for resistors 65, 68, 59 and 60, in combination.

It is also an outstanding feature of the invention that the resistors 65, 68, 59 and 60 may be selected to have resistance values to set two conditions, one of the conditions being that for zero current through ammeter 63. The other condition is that meter 63 indicates its minimum current at the maximum temperature, and ammeter 63 indicates its maximum current at the minimum temperature.

In FIG. 1, the Thevenin's equivalent resistance between junction 28 and ground (with ammeter 24, diode 34 and amplifier disconnected and source 10 shorted) is preferably constructed so that it is always at least as large as the plus input voltage span divided by the current range of ammeter 24.

It is an advantage of the invention that the equivalent resistance mentioned in the immediately preceding paragraph can be constructed as stated herein and, at the same time, meet a condition that the meter current be zero for a selected plus input voltage.

What is claimed is:

1. A voltage to current converter comprising: a differential amplifier having a plus and minus inputs, and an output, said amplifier being actuable to produce an output voltage and an output current at the said output thereof; first means connecting the output of said amplifier to said minus input; and variable source of potential connected from a point of reference potential to said plus input, the output voltage of said source being variable; said first means including second means actuable to sense said output current; first and second input leads, first and second resistors connected in series between said leads, the resistance of one of said first and second resistors changing in accordance with a predetermined variable, third and fourth resistors connected in series between said leads, third means connecting the mutual junction of said first and second resistors to said plus input, said first means including fourth means connecting the mutual junction of said third and fourth resistors to said minus input, said second means being connected from the output of said amplifier to the junction of said third and fourth resistors; said second means being an ammeter calibrated in temperature, said first resistor being a temperature sensitive resistor, said first means including fifth means providing resistance between the mutual junction of said third and fourth resistors and said minus input, sixth means to provide resistance between said minus input and said second lead, said first resistor being connected directly to said first lead; the resistance, $R_2$, of said third resistor being defined by $$R_2 = (E_s R_p)/e_2$$

where, $R_p$ is the ratio of the input voltage span desired to the current range of said ammeter, $E_s$ is the voltage to be applied between said input leads, and $e_2$ is the voltage at the mutual junction of said first and second resistors at which it is desired to produce zero current through said ammeter, the resistance, $R_3$, of said fourth resistor being defined by $$R_3 = [E_s R_p/(E_s - e_2)];$$

both of said leads being connected to said amplifier, said fifth means including a fifth resistor and a portion of a potentiometer connected series, said sixth means including the remainder of said potentiometer and a sixth resistor connected in series, said potentiometer having a wiper connected to said minus input, a first diode in series with one end of said first lead and poled to be conductive in an inward direction, a variable source of potential connected from said first diode anode, and a second diode connected in parallel with said ammeter and poled to be conductive in a direction toward said amplifier output, seventh and eighth resistors connected in series between said leads, a controller connected from the junction of said first and second resistors and from the junction of said seventh and eighth resistors, housing means providing an enclosable space, said first resistor being in said space, said controller being actuable to spray liquid nitrogen into said space when the temperature of said space rises above a predetermined temperature.

2. In heat transfer apparatus, the combination comprising: a first power input lead; a second power input lead; a first junction; a second junction; a third junction; a first resistor connected from said first lead to said first junction; a second temperature sensitive resistor connected from said first junction to aid second lead, said second resistor being positioned in a predetermined space; a third resistor; first means connecting said third resistor from said first lead to said second junction; a fourth resistor connected from said second junction to said second lead; a fifth resistor connected from said first lead to said third junction; a sixth resistor connected from said third junction to said second lead; a differential amplifier having inverting and noninverting inputs, and an output; an ammeter calibrated in temperature connected from said amplifier output to said third junction; second means connecting said third junction to said inverting input; third means connecting said first junction to said noninverting input; and fourth means connected from said first and second junctions and responsive to the difference in the potentials thereof for maintaining said space at an approximately constant predetermined temperature.

3. The invention as defined in claim 2, wherein said second means includes fifth means to provide resistance between said third junction and said inverting input, and sixth means to provide resistance between said third junction and said second lead.

4. The invention as defined in claim 2, wherein said second means includes a seventh resistor, a first potentiometer and an eighth resistor, said first potentiometer having a wiper movable on a winding, said seventh resistor, said first potentiometer winding and said eighth resistor being connected in series in that order from said third junction to said first lead, said first potentiometer wiper being connected to said inverting input.

5. The invention as defined in claim 4, including a D. C. source of potential having positive and negative poles, fifth means connecting said negative pole to said first lead, sixth means connecting said positive pole to said second lead, both of said leads being connected to said amplifier to supply electrical power thereto, a second potentiometer having a wiper movable on a winding, said second potentiometer winding being connected in series with said fourth resistor between said second lead and said second junction, said second potentiometer wiper being connected to one end of said winding thereof, and a diode connected in parallel with said ammeter and poled to be conductive in a direction toward said amplifier output.

* * * * *